United States Patent
Kreuzer

(10) Patent No.: US 8,231,750 B2
(45) Date of Patent: Jul. 31, 2012

(54) METHOD FOR COVERING A VEHICLE INTERIOR PART WITH LEATHER, IN PARTICULAR A VEHICLE STEERING WHEEL

(75) Inventor: Martin Kreuzer, Kleinwallstadt (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 832 days.

(21) Appl. No.: 12/313,537

(22) Filed: Nov. 21, 2008

(65) Prior Publication Data

US 2009/0142609 A1    Jun. 4, 2009

(30) Foreign Application Priority Data

Nov. 30, 2007  (DE) .......................... 10 2007 057 637

(51) Int. Cl.
*B32B 37/00* (2006.01)
(52) U.S. Cl. ...................................................... 156/73.5
(58) Field of Classification Search .............. 156/73.1, 156/73.5, 73.6, 250, 272.2
See application file for complete search history.

(56) References Cited

U.S. PATENT DOCUMENTS

| 5,205,887 | A | * | 4/1993 | Yabuya et al. | 156/73.5 |
| 5,840,144 | A | * | 11/1998 | Schumacher et al. | 156/267 |
| 6,797,087 | B2 | * | 9/2004 | Hosokawa et al. | 156/73.1 |
| 2004/0045396 | A1 | * | 3/2004 | Hosokawa et al. | 74/552 |

FOREIGN PATENT DOCUMENTS

| DE | 7928081 | 1/1980 |
| DE | 19911815 | 9/2000 |
| DE | 10140873 | 3/2003 |

* cited by examiner

*Primary Examiner* — James Sells
(74) *Attorney, Agent, or Firm* — Tarolli, Sundheim, Covell & Tummino LLP

(57) ABSTRACT

A method for covering a vehicle interior part with leather, particularly a vehicle steering wheel, includes the following steps: A leather piece being cut to size and having a front side, a rear side, and edges is provided with a thermoplastic layer on the rear side. The leather piece is fastened on the vehicle interior part by a high frequency welding process in a region of the thermoplastic layer.

11 Claims, 2 Drawing Sheets

METHOD FOR COVERING A VEHICLE INTERIOR PART WITH LEATHER, IN PARTICULAR A VEHICLE STEERING WHEEL

TECHNICAL FIELD

The invention relates to a method for covering a vehicle interior part with leather, in particular a vehicle steering wheel, and a corresponding vehicle interior part.

BACKGROUND OF THE INVENTION

Vehicle interior parts such as vehicle steering wheels, handles of handbrake levers or gearshift knobs are covered with leather in higher quality fitting variants. A piece of leather which is cut to size is wrapped around the vehicle interior part, and the opposed ends, which abut each other after wrapping, are sewn together. Until now, this sewing cannot be carried out by machine and must therefore still take place by laborious manual work. Seamstresses require 50 to 70 minutes for one vehicle steering wheel.

It is an object of the invention to indicate a more favourably priced method for covering a vehicle interior part with leather, in particular a leather steering wheel. In addition, a favourably priced vehicle interior part is also to be provided.

BRIEF SUMMARY OF THE INVENTION

A method for covering a vehicle interior part with leather, particularly a vehicle steering wheel, includes the following steps: A leather piece being cut to size and having a front side, a rear side, and edges is provided with a thermoplastic layer on the rear side. The leather piece is fastened on the vehicle interior part by a high frequency welding process in a region of the thermoplastic layer.

The leather itself is not, by nature, able to be welded, so that it first has to be provided with a thermoplastic layer on the rear side. Of course, the connection between this layer and the leather piece must be permanent, in order to prevent the leather piece from detaching. A weld connection between two thermoplastic parts is very reliable nowadays, so that there is also no risk of detachment.

According to the preferred embodiment, the leather piece is only welded onto the vehicle interior part in the region of the edges. The leather piece is preferably stretched taut over the vehicle interior part, so that no formation of bubbles occurs.

Before the welding, the leather piece is of course to be held on the vehicle interior part by means of clips or other fixing means, so that the position during welding is able to be clearly predetermined.

The vehicle interior part is to have the leather piece wrapped around it, so that opposed edges of the leather piece lie in abutment against each other, with the leather piece then being welded on both edges.

In this connection, it is entirely possible to provide a groove in the vehicle interior part in the region of the adjacent edges, into which groove the edges are inserted before they are welded. This embodiment prevents the edges of the leather from being visible and from becoming rough in the course of time.

The thermoplastic layer is preferably only applied onto the leather piece in the region of the edges. Between the thermoplastic layers in the region of the edges the leather piece has no coating on its rear side.

The application of the thermoplastic layer can preferably take place by means of laminating.

The invention allows the welding process and the relative movement of the vehicle interior part and the welding apparatus to be carried out fully automatically, for example by means of a multiple-axle, freely programmable device. The expensive manual work can thereby be dispensed with entirely. Here, of course, either the vehicle interior part or the welding apparatus can be moved, or both. In a steering wheel, at least one direction of movement is able to be realized relatively simply, namely the peripheral direction. Here, the steering wheel only has to be held in the hub and rotated.

On the vehicle interior part, a surface is present which permits high frequency welding. This can be achieved for example in that a second thermoplastic layer is likewise applied onto the vehicle interior part in the region of the thermoplastic layer of the leather.

This application of the thermoplastic layer can be carried out only partially, if necessary, in order to save costs.

In addition, the hardness of the thermoplastic layer is in part undesired because of the feel, so that the thermoplastic layer only occupies a small portion of the outer surface of the vehicle interior part.

Alternatively, the vehicle interior part itself can of course consist at least partially of a thermoplastic material.

The feel is also very important in vehicle interior parts. There are therefore several vehicle interior parts which consist of a hard inner layer and a soft, e.g. foamed, outer layer. The leather piece could not be welded onto this foamed outer layer. One embodiment therefore proposes allowing the thermoplastic inner material which is enclosed by a non-thermoplastic outer material, to extend in the weld seam region towards the outer side. In a leather steering wheel, this region would be the abutment region of the leather edges.

Furthermore, the invention also provides a vehicle interior part, in particular a vehicle steering wheel, which is provided with a leather covering which is fastened to the vehicle interior part by means of high frequency welding. On the rear side, the leather covering has a thermoplastic layer which is welded on.

In a radial cross section of the vehicle steering wheel, the leather covering extends around the entire circumference of a steering wheel rim.

The thermoplastic layer is preferably an adhesive film which is glued to the edge of the leather part.

Preferably the thermoplastic layer is not a layer of foam.

One embodiment makes provision that a narrow, shared thermoplastic strip is provided for the mounting of the leather on the vehicle interior part, onto which the leather piece is welded and to which non-thermoplastic material of the vehicle interior part is laterally adjacent.

Natural leather can, of course, be processed in particular by the invention. However, if synthetic leathers which are not able to be welded, in particular synthetic suede, are to be used for the leather covering, these can also be provided with a thermoplastic layer and used according to the invention.

Preferably the weld seam is realized in a way that its extension is visible from the exterior and provides depressions in the leather piece to mimic a handsewn seam. A high frequency welding apparatus or a welding tool presses against the leather under pressure which leaves behind a permanent depression in the leather piece.

The invention can also be used on vehicle interior parts which have a large area, such as leather-covered instrument panels or parts thereof.

DETAILED DESCRIPTION OF THE PREFERRED EMBODIMENTS

Figure 1:
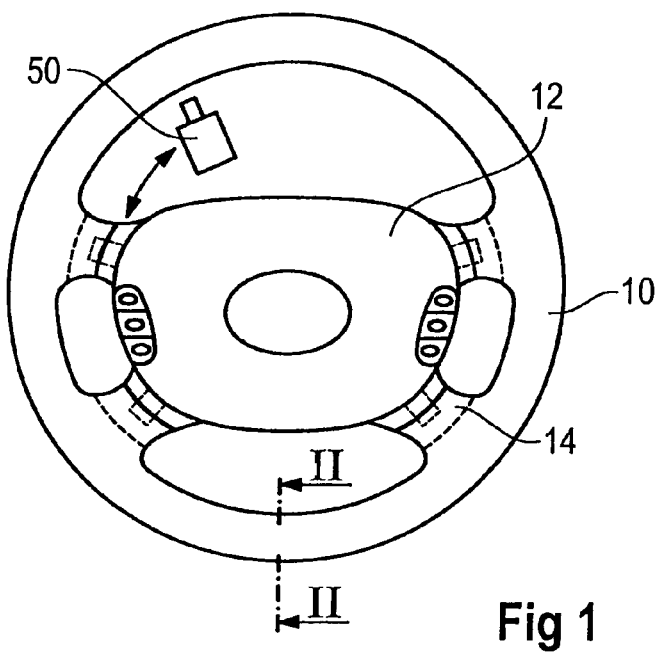
FIG. 1 shows a top view onto a vehicle steering wheel according to the invention, which has been covered with leather by the method according to the invention.

In FIG. 1 a vehicle interior part 11 is illustrated in the form of a vehicle steering wheel which has an encircling steering wheel rim 10, a hub 12, and spokes 14 connecting hub 12 and steering wheel rim 10.

Figure 2:
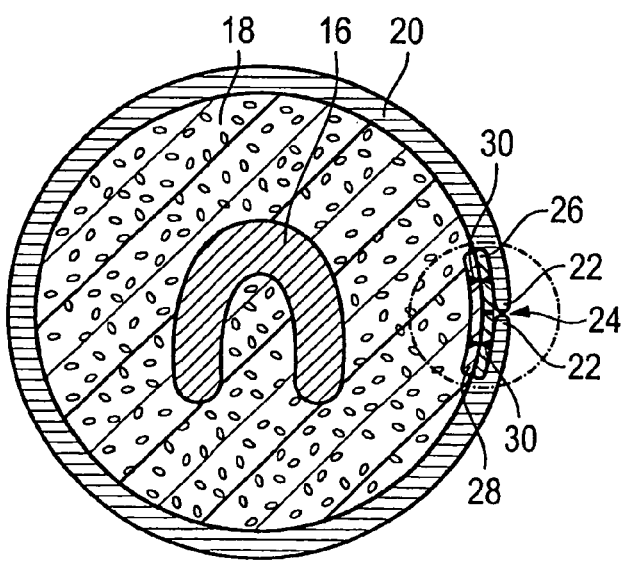
FIG. 2 shows a cross-sectional view along the line II-II in FIG. 1 through the steering wheel rim.

The cross-section through the steering wheel rim, shown in FIG. 2, provides further information regarding the structure of the steering wheel itself. A so-called steering wheel skeleton 16 which consists of a metal alloy is provided in the interior of the steering wheel. This steering wheel skeleton 16 is enclosed by an outer layer 18. This outer layer 18 is preferably a foam surround.

As an alternative to this, however, there are also solutions in which prefabricated shells are applied onto the steering wheel skeleton 16 or a combination of shells and foam surround is provided. The steering wheel skeleton 16 and the outer layer 18 form the previously mentioned vehicle interior part 11 which is covered with leather.

A leather piece 20 which has been cut to size surrounds the previously described vehicle interior part 11 and is fastened to it. The leather piece 20 has two opposed edges 22 which abut each other after wrapping around the steering wheel rim and, if applicable, also the spokes. The abutment is given reference number 24.

Figure 3:
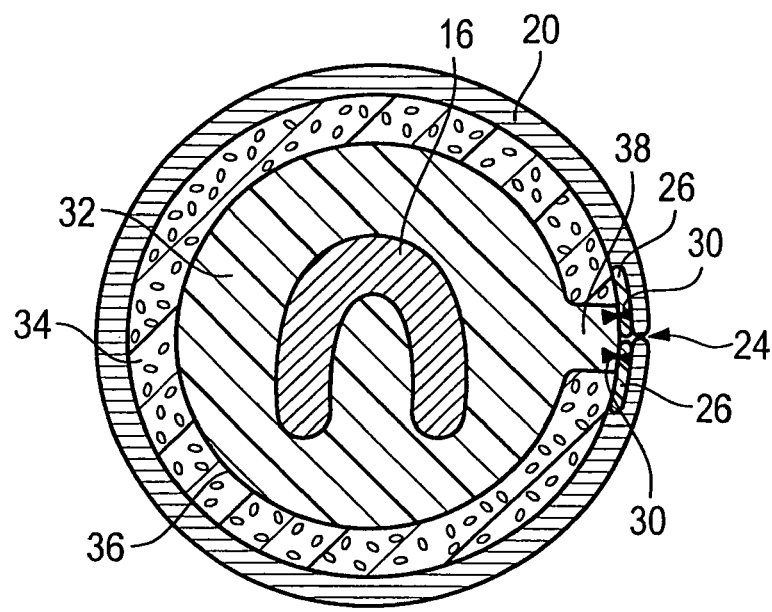
FIG. 3 shows a sectional view according to FIG. 2 through the steering wheel rim according to a second embodiment.
Figure 4:
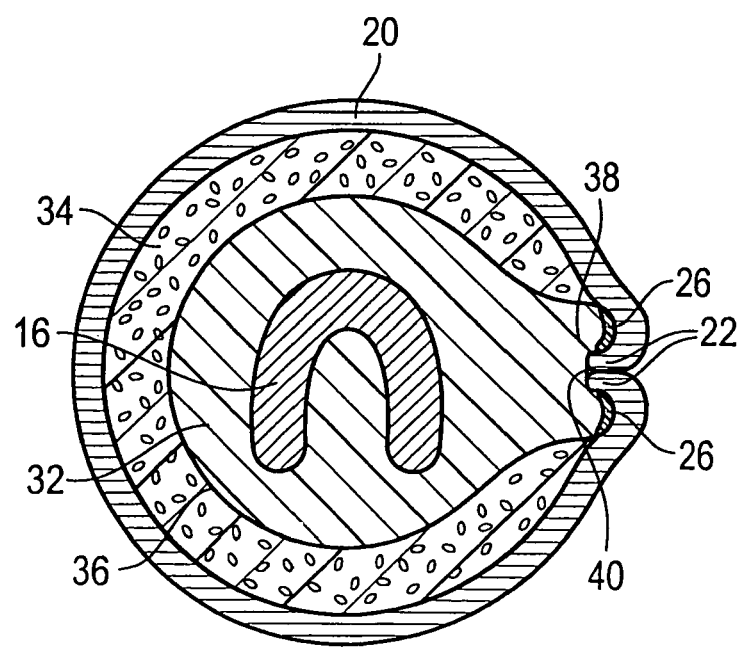
FIG. 4 shows a sectional view according to FIG. 2 through the steering wheel rim according to a third embodiment.

In the radial cross section of the steering wheel the leather piece 20 extends around the total circumference of the steering wheel rim 10 (see FIGS. 2 to 4).

A thermoplastic layer 26 is fastened, in particular by laminating, on the rear side, i.e. the inner side of the leather piece 20 in the region of the edges 22. Between the thermoplastic layers 26 the leather piece has no coating on its rear side.

One option for the application of the thermoplastic layer consists in sticking an adhesive film of thermoplastic material onto the leather piece 20.

The vehicle interior part 11 also has its own thermoplastic layer 28, fastened to the vehicle interior part 11 before the covering with leather, in the region of the thermoplastic layer 26.

This thermoplastic layer 28 can, for example, likewise be an adhesive strip or a corresponding piece which has been embedded into the outer layer 18 during the surrounding of the skeleton 16 with foam. The thermoplastic layer 26 is not a layer of foam.

Figure 2A:
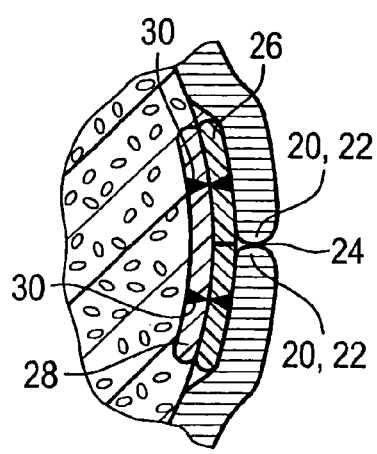
FIG. 2a shows an enlarged part of the cross-section view of the FIG. 2 in the welding region.

The leather piece 20 is fastened to the vehicle interior part 11 in the region of the edges 22 by means of high frequency welding. In so doing, the thermoplastic layers 26 and 28 become connected with each other. The corresponding weld lines or weld points are given reference number 30 and are illustrated on a slightly enlarged scale in FIG. 2a.

Depressions 42 in the leather piece 20 in the region of the weld seam mimic a handsewn seam which is visible from the exterior.

The leather piece 20 itself is not able to be welded; its material would not permit a high frequency welding process.

In the embodiment according to FIG. 3, the skeleton 16 is firstly enclosed by a thermoplastic inner material 32 which is again enclosed by a non-thermoplastic outer material 34. This outer material 34 can, for example, likewise be a foam surround. In order eliminate the separate thermoplastic layer 28, the thermoplastic inner material 32 is formed to reach the outer side 36 of the vehicle interior part 11. Here, a corresponding bulge 38 is envisaged, which the thermoplastic layer 26 can be welded onto.

In addition, the inner material 32 is also distinctly harder than the outer material 34.

The leather piece here likewise again has the thermoplastic layer 26, by means of which the leather piece 20 is fastened to the vehicle interior part 11, more precisely to the bead 38.

The embodiment according to FIG. 4 corresponds substantially to that of FIG. 3. However, in the region of the bead 38 an encircling groove 40 is provided on the outer side, into which the edges 22 are inserted, so that a pre-positioning takes place. In the region of the edges 22, the thermoplastic layers 26 are of course again applied on the rear side onto the leather piece 20, so that a high frequency welding can take place from the exterior.

The manufacture of the vehicle interior part 11 according to the invention is explained below.

Firstly the leather piece 20 is cut to size and is then provided on the rear side with the thermoplastic layer 26 on the edges 22.

Preferably, a thermoplastic layer 26 is only provided in the region of the edges 22. In this embodiment the leather piece 20 has no coating on its rear side between the thermoplastic layers 26 in the region of the edges 22.

The leather piece 20 is then stretched around the interior part of the vehicle and is held securely in position by means of clips or other fastening means.

The interior part of the vehicle, which is thus covered with leather, is inserted into a device which is provided with a high frequency welding apparatus which is indicated by reference number 50 in FIG. 1. The leather piece 50 is then fastened to the vehicle interior part 11 by means of the high frequency welding apparatus 50.

A linear weld seam or punctiform weld seams can be formed. A zigzag-shaped weld seam pattern would also be conceivable.

To mimic a handsewn seam, the weld seam is realized in a way that its extension is visible from the exterior. The imitated weld seam, visible from the exterior, is formed in that the high frequency welding apparatus 50 or a welding tool presses against the leather under pressure and a rise in temperature, which leaves behind a permanent depression 42 (see FIG. 2a). It is of course possible that the weld seam is only in part visible from the exterior.

The interior part of the vehicle is turned around the hub 12 between welding processes. The entire welding process takes place fully automatically.

The processed leather piece 20 is preferably a natural leather, but also synthetic leathers are also conceivable which, however, per se would not make any high frequency welding possible.

The invention claimed is:

1. A method for covering a vehicle interior part (11) with leather, particularly a vehicle steering wheel, comprising the following steps:

providing a leather piece (20) being cut to size and having a front side, a rear side, and edges (22) with a thermoplastic layer (26) on said rear side, said thermoplastic layer (26) abutting said leather piece (20) and only being applied onto said leather piece (20) in a region of the edges (22), and fastening said leather piece (20) on said vehicle interior part (11) by a high frequency welding process in a region of said thermoplastic layer (26).

2. The method according to claim 1, wherein said leather piece (20) is only welded in a region of its edges onto said vehicle interior part (11).

3. The method according to claim 1, wherein said vehicle interior part is wrapped in said leather piece (20), so that opposed edges (22) of said leather piece (20) lie in abutment to each other, said leather piece (20) being welded onto said vehicle interior part (11) in a region of both said edges (22).

4. The method according to claim 1, wherein said rear side of said leather piece (20) is laminated with said thermoplastic layer (26).

5. The method according to claim 1, wherein said high frequency welding process and a relative movement of said vehicle interior part and a welding apparatus (50) are carried out fully automatically.

6. The method according to claim 1, wherein a second thermoplastic layer (28) is likewise applied onto said vehicle interior part (11) in said region of said thermoplastic layer (26) only in a region of said edges (22) of said leather piece (20).

7. The method according to claim 1, wherein said vehicle interior part (11) consists at least in sections of a thermoplastic material.

8. The method according to claim 1, wherein said vehicle interior part (11) has a thermoplastic inner material (32) which is enclosed externally by a non-thermoplastic outer material (34), said inner material (32) extending outward through said non-thermoplastic outer material (34) up to an outer surface (36) of said vehicle interior part (11) in a weld seam region.

9. The method according to claim 1, wherein a high frequency welding apparatus (50) is provided, said high frequency welding apparatus (50) pressing against said leather piece (20) and leaving a permanent depression (42) in said leather piece on the outside of the weld seam.

10. The method according to claim 1 further comprising securing the thermoplastic layer (26) to the leather piece (20) with adhesive.

11. The method according to claim 1, wherein the edges (22) constitute a pair of opposed edges (22) that are placed in abutment with one another such that the leather piece (20) encircles the vehicle interior part (11).

* * * * *